United States Patent
Hu et al.

(10) Patent No.: US 9,072,068 B2
(45) Date of Patent: Jun. 30, 2015

(54) GROUP CALL METHOD, DEVICE AND TERMINAL

(71) Applicant: Huawei Technologies Co., Ltd., Shenzhen (CN)

(72) Inventors: Zhenxing Hu, Shenzhen (CN); Yue Li, Shenzhen (CN); Song Zhu, Shenzhen (CN); Jie Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/952,086

(22) Filed: Jul. 26, 2013

(65) Prior Publication Data
US 2013/0310086 A1    Nov. 21, 2013

Related U.S. Application Data

(63) Continuation of application No. PCT/CN2012/070077, filed on Jan. 5, 2012.

(30) Foreign Application Priority Data
Jan. 29, 2011    (CN) .......................... 2011 1 0032368

(51) Int. Cl.
*H04W 68/02*    (2009.01)
*H04W 48/06*    (2009.01)

(52) U.S. Cl.
CPC .............. *H04W 68/02* (2013.01); *H04W 48/06* (2013.01)

(58) Field of Classification Search
USPC ................... 455/458, 519; 370/236, 329, 352
See application file for complete search history.

(56) References Cited

U.S. PATENT DOCUMENTS

| 2006/0276214 | A1 | 12/2006 | Harris et al. |
| 2008/0287146 | A1 | 11/2008 | Liu et al. |

(Continued)

FOREIGN PATENT DOCUMENTS

| CN | 1735262 A | 2/2006 |
| CN | 1859642 A | 11/2006 |

(Continued)

OTHER PUBLICATIONS

3GPP, "3rd Generation Partnership Project; Technical Specification Group Radio Access Network; Radio Resource Control (RRC); Protocol Specification" (Release 9) 3GPP TS 25.331. V9.5.0, Dec. 2010, 1,795 pages.

(Continued)

*Primary Examiner* — Sam Bhattacharya
(74) *Attorney, Agent, or Firm* — Brinks Gilson & Lione (57) ABSTRACT

The present invention discloses a group call method, device and terminal, belonging to the field of communications technologies. The method includes: calculating, according to the load of a RAN device, the number of subgroups in a group maintained by the RAN device; and send a paging message carrying relevant information of the number of the subgroups, so that a terminal receiving the paging message determines, according to relevant information of the number of the subgroups, whether to respond to the paging message. The device is a RAN device or a CN device. The terminal includes a receiving module and a processing module. In the present invention, the number of paging groups and an in-group terminal being paged are determined dynamically without requiring a core network to maintain subgroup information, thereby greatly saving subgroup maintaining resources as well as signaling and processing resources.

40 Claims, 6 Drawing Sheets

(56) References Cited

U.S. PATENT DOCUMENTS

| | | |
|---|---|---|
| 2009/0274050 A1 | 11/2009 | Johansson et al. |
| 2010/0260090 A1 | 10/2010 | Santhanam et al. |
| 2010/0279715 A1 | 11/2010 | Alanara et al. |

FOREIGN PATENT DOCUMENTS

| | | |
|---|---|---|
| CN | 1874554 A | 12/2006 |
| CN | 1946207 A | 4/2007 |
| CN | 101137115 A | 3/2008 |
| CN | 101479997 A | 7/2009 |
| CN | 101755475 A | 6/2010 |
| CN | 101835094 A | 9/2010 |
| WO | WO 2004/028179 A1 | 4/2004 |
| WO | WO 2007/062548 A1 | 6/2007 |
| WO | WO 2008/052383 A1 | 5/2008 |
| WO | WO 2009/008456 A1 | 1/2009 |
| WO | WO 2009/069927 A2 | 6/2009 |
| WO | WO 2009/148258 A2 | 12/2009 |
| WO | WO 2011/006768 A1 | 1/2011 |

OTHER PUBLICATIONS

Lee et al., "Access Distribution for M2M Devices" LG Electronics, Dec. 31, 2010, 7 pages.

Park et al., "Group based paging operation for 802.16p system" IEEE 802.16 Presentation Submission Template (Rev.9.2), Dec. 29, 2010, 7 pages.

Huawei, "RAN overload control solutions" 3GPP TSG-RAN WG2 Meeting #70bis. Stockholm, Sweden, Jun. 28-Jul. 2, 2010, 5 pages.

GROUP CALL METHOD, DEVICE AND TERMINAL

CROSS-REFERENCE TO RELATED APPLICATIONS

This application is a continuation of International Application No. PCT/CN2012/070077, filed on Jan. 5, 2012, which claims priority to Chinese Patent Application No. 201110032368.2, filed on Jan. 29, 2011, both of which are hereby incorporated by reference in their entireties.

TECHNICAL FIELD

The present invention relates to the field of communications technologies, and in particular, to a group call method, device and terminal.

BACKGROUND

As mobile communications develop, M2M (Machine To Machine, machine to machine) communication emerges. Compared with previous H2H (Human to Human, human to human) communication, M2M communication supports a much larger number of terminals, which is roughly estimated to be 50 billions, about 10 times the number of H2H communication terminals. For example, in a currently popular smart grid, the number of electric meters may reach 100 thousand in a cell.

The smart grid is one of relatively practical M2M applications. To optimize electric energy allocation, grid terminals are required to report data periodically. The huge number of grid terminals makes it infeasible to page terminals one by one for triggering data reporting. A group call in clustering naturally becomes a choice for optimization. A group call may reduce the paging load. However, if in-group terminals receive a group call message at the same time, they may initiate dense access within a short time, causing access channels of a RAN (Radio Access Network, radio access network) to be overloaded. Moreover, massive access of multiple groups may also cause signaling overload on a CN (Core Network, core network).

At present, a solution has been proposed to divide terminals in a group into more subgroups and initiate group calls based on subgroups to reduce the load or overload on a core network. However, the disadvantage of this solution lies in that: this solution not only requires processing resources for maintaining the subgroups, but also consumes additional signaling and processing resources for changing subgroup configurations.

SUMMARY

Various aspects of the present invention provide a group call method, device and terminal.

One aspect of the present invention provides a group call method. The method includes: calculating, according to a load of a radio access network RAN device, the number of subgroups in a group maintained by the RAN device; and sending a paging message carrying relevant information of the number of the subgroups, so that a terminal receiving the paging message determines, according to relevant information of the number of the subgroups, whether to respond to the paging message.

Another aspect of the present invention provides a radio access network RAN device. The RAN device includes: an obtaining module, configured to obtain the number of subgroups in a group maintained by the RAN device, which is calculated based on a load of the RAN device; and a paging module, configured to send a paging message carrying relevant information of the number of the subgroups, so that a terminal receiving the paging message determines, according to relevant information of the number of the subgroups, whether to respond to the paging message.

Another aspect of the present invention provides a core network CN device. The CN device includes: a first sending module, configured to send, after calculating an allowed access density according to a load of the CN device, receiving a load of the RAN device sent from the RAN device, and calculating, according to the load of the RAN device and the allowed access density, the number of subgroups in a group maintained by the RAN device, the number of the subgroups to the RAN device, so that the RAN device sends a paging message carrying relevant information of the number of the subgroups, where the relevant information of the number of the subgroups is used by a terminal receiving the paging message to determine whether to respond to the paging message; or, a second sending module, configured to send a load of the CN device to a RAN device, so that the RAN device calculates an allowed access density according to the load of the CN device, calculates the number of subgroups in a group maintained by the RAN device according to the allowed access density and the load of the RAN device, and sends a paging message carrying relevant information of the number of the subgroups, where the relevant information of the number of the subgroups is used by a terminal receiving the paging message to determine whether to respond to the paging message; or, a third sending module, configured to calculate an allowed access density according to a load of the CN device, and send the allowed access density to a RAN device, so that the RAN device calculates, according to the allowed access density and the load of the RAN device, the number of subgroups in a group maintained by the RAN device and sends a paging message carrying relevant information of the number of the subgroups, where the relevant information of the number of the subgroups is used by a terminal receiving the paging message to determine whether to respond to the paging message.

Another aspect of the present invention provides a terminal. The terminal includes: a receiving module, configured to receive a paging message carrying relevant information of the number of subgroups in a group maintained by a RAN device; and a processing module, configured to determine, according to relevant information of the number of the subgroups, whether to respond to the paging message, where the number of subgroups in the group maintained by the RAN device is calculated by a network according to a load of the RAN device.

Compared with the prior art, the core network does not need to maintain subgroup information, which saves not only subgroup maintaining resources but also additional signaling and processing resources which are supposed to be consumed for changing subgroup configurations, and avoids access congestion at an air interface.

DESCRIPTION OF EMBODIMENTS

In order to make the objectives, technical solutions, and advantages of the present invention clearer, embodiments of the present invention are further described in detail in the following with reference to the accompanying drawings.

Embodiment 1

Figure 1:
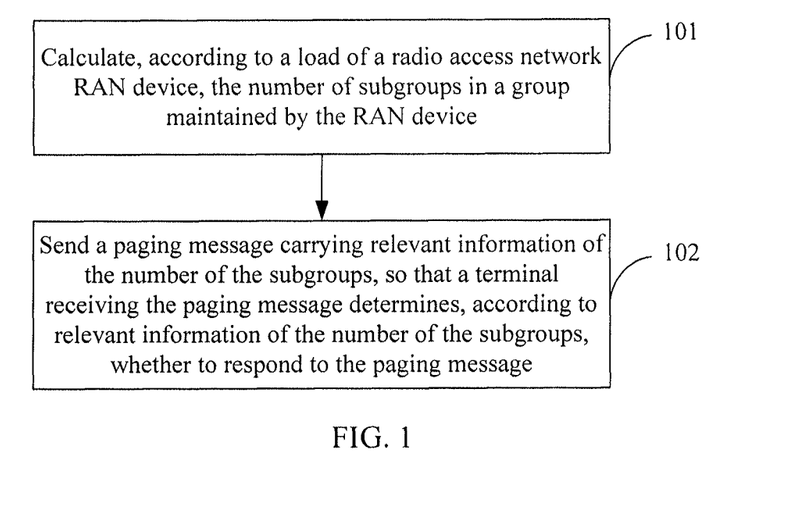
FIG. 1 is a flowchart of a group call method according to Embodiment 1 of the present invention.

As shown in FIG. 1, this embodiment provides a group call method.

101: Calculate, according to a load of a radio access network RAN device, the number of subgroups in a group maintained by the RAN device.

102: Send a paging message carrying relevant information of the number of the subgroups, so that a terminal receiving the paging message determines, according to relevant information of the number of the subgroups, whether to respond to the paging message.

Optionally, calculate, according to a load of a core network CN device and the load of the RAN device, the number of subgroups in the group maintained by the RAN device.

The CN device in embodiments of the present invention may be connected with one or multiple RAN devices. Generally, the CN device is connected with multiple RAN devices, and each RAN device maintains multiple terminals. Information maintained by the CN device includes: RAN device information and terminal distribution information. RAN device information includes a RAN device identifier. Terminal distribution information includes the number of groups maintained by each RAN device and the number of terminals in each group. The CN device may classify groups maintained by the RAN device by service or application. Generally, one group maintained by the RAN device corresponds to one service or one application. For example, 100 terminals connected to the RAN device are classified into three groups: 20 electric meters in one group, 50 water meters in one group, and 30 gas meters in one group. A technical solution provided by embodiments of the present invention implements paging of any one group maintained by the RAN device. If the RAN device maintains multiple groups, the currently paged group is one of them and is generally designated by the CN device according to the service or application. If multiple groups need to be paged, the above procedure may be simply repeated, which is not described in detail. Information maintained by a RAN device includes the number of terminals in a group maintained by the RAN device and terminal information. Terminal information includes the terminal identifier or sequence number, etc. When the RAN device maintains multiple groups, maintained information includes the number of terminals in each group and information of terminals in each group. In embodiments of the present invention, "a group maintained by the RAN device" in "the number of subgroups in a group maintained by the RAN device" refers to a group of the current group call, which is a group designated by the CN device according to the service or application, not all groups maintained by the RAN device. The number of subgroups in a group maintained by the RAN device is obtained after all terminals in a group of the current group call are further grouped. The number of the subgroups is dynamically determined according to the load of the RAN device or according to the load of the CN device and the load of the RAN device. Therefore, the RAN device does not need to maintain the number of subgroups in each group and terminal distribution information in each subgroup, thereby greatly saving processing resources.

The terminal in embodiments of the present invention may be an M2M application terminal, including but not limited to electric meter terminal, water meter terminal, and gas meter terminal. Embodiments of the present invention are not limited to these specific terminals.

The load of the CN device and the load of the RAN device in embodiments of the present invention refer to the load for the moment. The load of the CN device and the load of the RAN device may change over time. Accordingly, the calculated number of the subgroups may change. The paging message in embodiments of the present invention refers to a group call paging message, which is hereinafter referred to as a paging message for convenience of description.

The load of the RAN device includes: the available bearer resources of the RAN device, the available access resources of the RAN device, the access efficiency of the RAN device, and the number of terminals in a group maintained by the RAN device.

Relevant information of the number of the subgroups can be any of the following information:

the number of the subgroups and the group sequence number; or the terminal identifier and the identifier offset value of a paged initial terminal; or the terminal sequence number and the sequence number offset value of a paged initial terminal; or the paging probability determined according to the number of the subgroups.

In embodiments of the present invention, a terminal sequence number refers to a sequence number allocated to a terminal by the network in the group call establishment procedure. The sequence number may be stored on the terminal side.

In embodiments of the present invention, the sending of a paging message may be periodic, for example, a paging message sending is periodically triggered by a timer, or application-based, for example, a paging message is sent when the network needs to collect terminal data. This is not limited in embodiments of the present invention.

According to the method provided in this embodiment, the number of subgroups in a group maintained by the RAN device is calculated according to the load of the RAN device, and a paging message carrying relevant information of the number of the subgroups is sent, so that a terminal receiving the paging message may determine, according to relevant information of the number of the subgroups, whether to respond to the paging. Compared with the prior art, the number of the subgroups and an in-group terminal being paged are dynamically determined without requiring the core network to maintain subgroup information, thereby saving subgroup maintaining resources as well as additional signaling and processing resources which are supposed to be consumed for change of subgroup configurations, and avoiding access congestion at an air interface.

Embodiment 2

Figure 2:
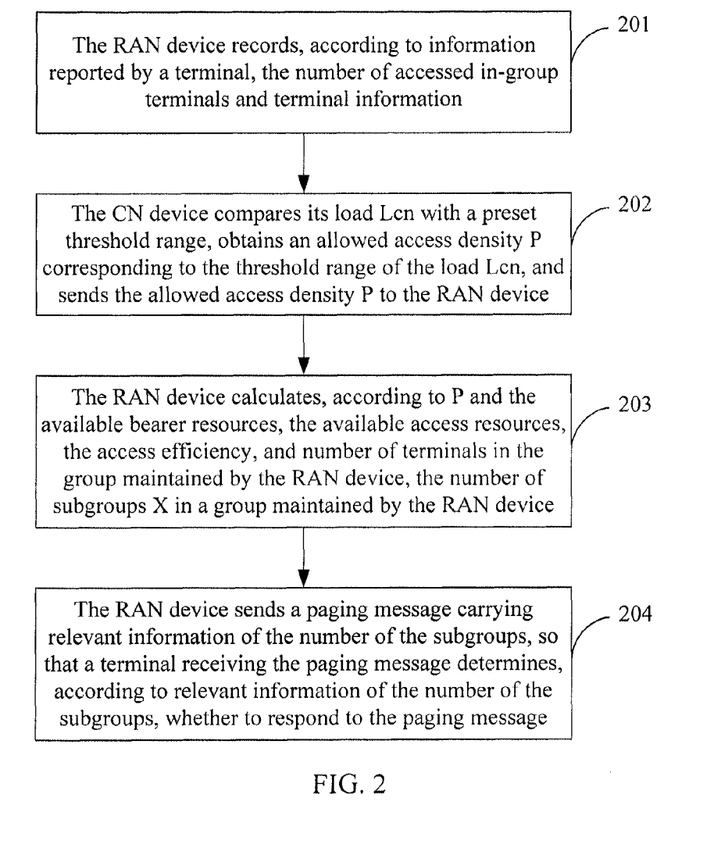
FIG. 2 is a flowchart of a group call method according to Embodiment 2 of the present invention.

As shown in FIG. 2, this embodiment provides a group call method, in which a RAN device calculates the number of the subgroups.

201: The RAN device records, according to information reported by a terminal, the number of accessed in-group terminals and terminal information, wherein the terminal information includes but is not limited to a terminal identifier or sequence number, etc.

Step 201 may be replaced with the following step:

The RAN device receives a message, which is sent by a CN device according to information reported by a terminal, and records the number of accessed in-group terminals and information of the terminals carried in the message.

The RAN device and the CN device specifically communicate using an S1 interface or an Iu interface.

202: The CN device compares its load Lcn with a preset threshold range, obtains an allowed access density P corresponding to the threshold range of the load Lcn, and sends the allowed access density P to the RAN device over the S1 interface or the Iu interface.

The allowed access density in this embodiment represents the current terminal access capability of the CN device. The higher the allowed access density is, the more terminals can be currently accessed; the smaller the allowed access density is, the fewer terminals can be currently accessed.

Generally, there are multiple preset threshold ranges, and each threshold range corresponds to a preset allowed access density. For example, there are three threshold ranges for a preset threshold 1 and a preset threshold 2: smaller than threshold 1, equal to or greater than threshold 1 and smaller than or equal to threshold 2, and greater than threshold 2; the allowed access densities corresponding to the three threshold ranges are allowed access density 1, allowed access density 2, and allowed access density 3. Then, if the current load of the CN device is smaller than threshold 1, the allowed access density 1 is applied as the allowed access density; if the current load of the CN device is equal to or greater than threshold 1 and smaller than or equal to threshold 2, the allowed access density 2 is applied as the allowed access density; if the current load of the CN device is greater than threshold 2, the allowed access density 3 is applied as the allowed access density. Similarly, there may be three, four, or more preset thresholds, and accordingly, there are more threshold ranges and more preset allowed access densities, but each threshold range must correspond to one allowed access density.

203: The RAN device receives the allowed access density P, and calculates, according to the allowed access density P and the load parameters of the RAN device, including available bearer resource SRB, available access resource SRA, access efficiency E, and number of terminals in the group maintained by the RAN device N, the number of the subgroups X.

Specifically, the following formula may be used:

$X = \mathrm{fun}(P, SRB, SRA, E, N)$

Where, fun indicates a preset function, which can be set according to actual needs and is not limited in embodiments of the present invention.

204: The RAN device sends a paging message carrying relevant information of the number of the subgroups, so that a terminal receiving the paging message determines, according to relevant information of the number of the subgroups, whether to respond to the paging message.

In this embodiment, steps 202 and 203 may be replaced with the following steps:

The CN device sends its load Lcn to the RAN device using the S1 interface or Iu interface; after receiving the load Lcn, the RAN device compares the load Lcn with the preset threshold range, and obtains the allowed access density P corresponding to the threshold range of the load Lcn; the RAN device calculates, according to the allowed access density P and the load parameters of the RAN device, including the available bearer resource SRB, available access resource SRA, access efficiency E, and number of terminals in the group maintained by the RAN device N, the number of the subgroups X.

The CN device may send its load to the RAN device using the S1 interface or the Iu interface at preset intervals or when a specified event is detected. The specified event may be a load change event or a group call event, etc, which is not limited in the embodiment of the present invention.

According to the method provided in this embodiment, the number of subgroups in a group maintained by the RAN is calculated according to the load of the CN device and the load of the RAN device, and a paging message carrying relevant information of the number of the subgroups is sent, so that a terminal receiving the paging message may determine, according to relevant information of the number of the subgroups, whether to respond to the paging. Compared with the prior art, the number of the subgroups and an in-group terminal being paged are dynamically determined without requiring the core network to maintain subgroup information, thereby saving subgroup maintaining resources as well as additional signaling and processing resources consumed for change of subgroup configurations, and avoiding access congestion at an air interface.

Embodiment 3

This embodiment provides a group call method, which differs from Embodiment 2 in that the number of the subgroups is calculated by the CN device. See FIG. 3.

Figure 3:
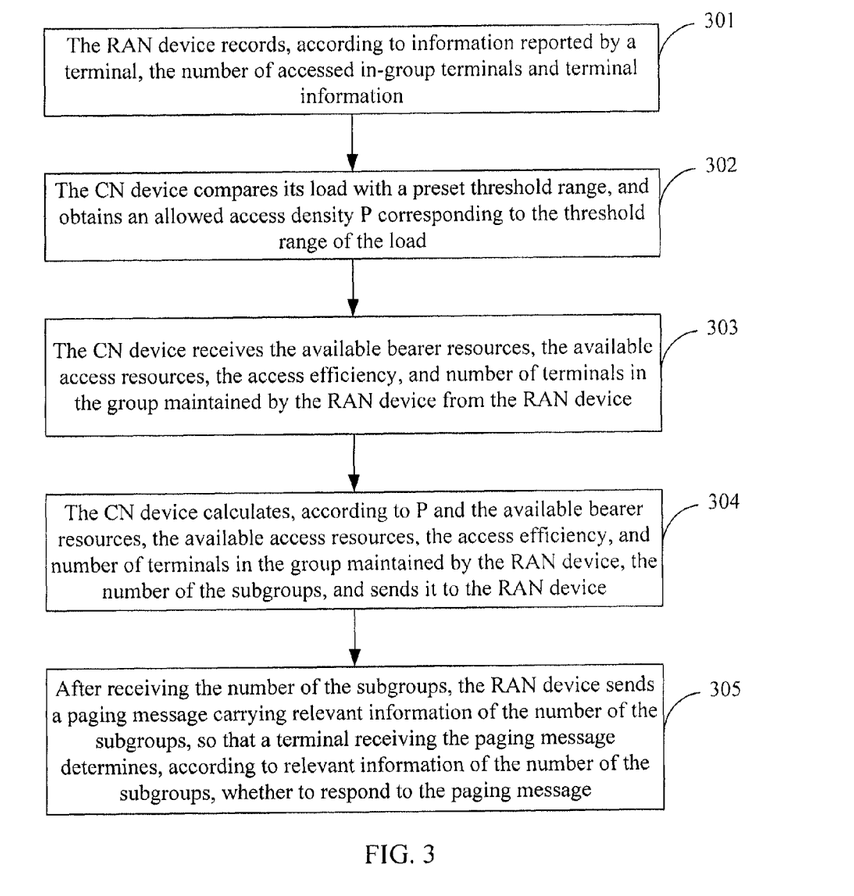
FIG. 3 is a flowchart of a group call method according to Embodiment 3 of the present invention.

301: The RAN device records, according to information reported by a terminal, the number of accessed in-group terminals and terminal information, where the terminal information includes but is not limited to a terminal identifier or sequence number, etc.

Step 301 may be replaced with the following step:

The CN device records, according to information reported by a terminal, the number of accessed in-group terminals and terminal information, and sends the number of accessed in-group terminals and terminal information to the RAN device using an S1 interface or an Iu interface. The RAN device receives and records the number of in-group terminals and terminal information.

302: The CN device compares its load Lcn with a preset threshold range, and obtains an allowed access density corresponding to the threshold range of the load.

303: The CN device receives the load parameters of the RAN device sent by the RAN device using the S1 interface or the Iu interface, where the load parameters of the RAN device includes the available bearer resource of the RAN device, the available access resource of the RAN device, the access efficiency of the RAN device, and the number of terminals in the group maintained by the RAN device.

304: The CN device calculates, according to the allowed access density and the available bearer resource, available access resource, access efficiency, and number of terminals in the group maintained by the RAN device, the number of subgroups in the group maintained by the RAN device, and sends the number of the subgroups to the RAN device using the S1 interface or the Iu interface.

305: After receiving the number of the subgroups, the RAN device sends a paging message carrying relevant information of the number of the subgroups, so that a terminal receiving the paging message determines, according to relevant information of the number of the subgroups, whether to respond to the paging message.

According to the method provided in this embodiment, the number of subgroups in a group maintained by the RAN is calculated according to the load of the CN device and the load of the RAN device, and a paging message carrying relevant information of the number of the subgroups is sent, so that a terminal receiving the paging message may determine, according to relevant information of the number of the subgroups, whether to respond to the paging. Compared with the prior art, the number of the subgroups and an in-group terminal being paged are dynamically determined without requiring the core network to maintain subgroup information, thereby saving subgroup maintaining resources as well as additional signaling and processing resources which are supposed to be consumed for change of subgroup configurations, and avoiding access congestion at an air interface.

Embodiment 4

Figure 4:
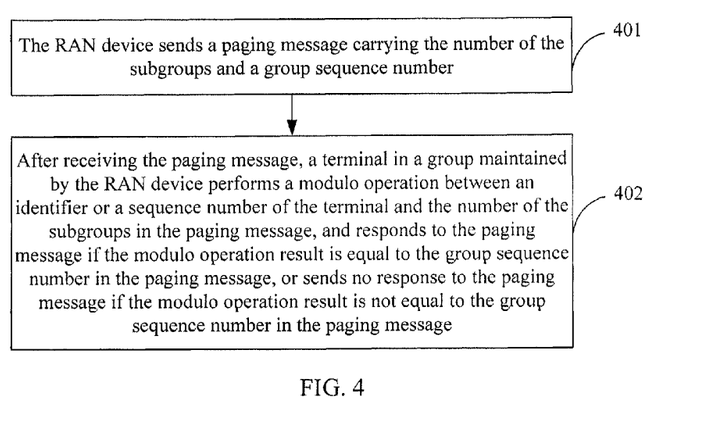
FIG. 4 is a first flowchart for initiating and responding to the paging according to Embodiment 4 of the present invention.

This embodiment is improved on a basis of Embodiment 1, 2, or 3 and specifically limits the following steps involved in step 103, 204, or 305: send a paging message carrying relevant information of the number of the subgroups, so that a terminal receiving the paging message determines, according to relevant information of the number of the subgroups, whether to respond to the paging message. Specifically, any of the following manners may be adopted to initiate and respond to the paging:

FIG. 4 shows the first manner. The process for initiating and responding to a paging message is as follows:

401: The RAN device sends a paging message carrying the number of the subgroups and a group sequence number.

402: After receiving the paging message, a terminal in a group maintained by the RAN device performs a modulo operation between an identifier or a sequence number of the terminal and the number of the subgroups in the paging message, and responds to the paging message if the modulo operation result is equal to the group sequence number in the paging message, or no responds to the paging message if the modulo operation result is not equal to the group sequence number in the paging message.

The group sequence number refers to the sequence number of each group. The value range of the group sequence number is [0, number of the subgroups-1]. In 401, the sequence number carried in the paging message is the sequence number of a group being paged, which is specified by the RAN device. For example, if the RAN device sequentially pages each subgroup, the RAN device respectively specifies the sequence number of a group being paged as 0, 1, 2, . . . , number of the subgroups-1 to complete paging of all subgroups. The terminal sequence number is a sequence number allocated by the network to a terminal during establishment of a group call, which may identify the terminal. The terminal sequence number is also stored on the terminal.

Figure 5:
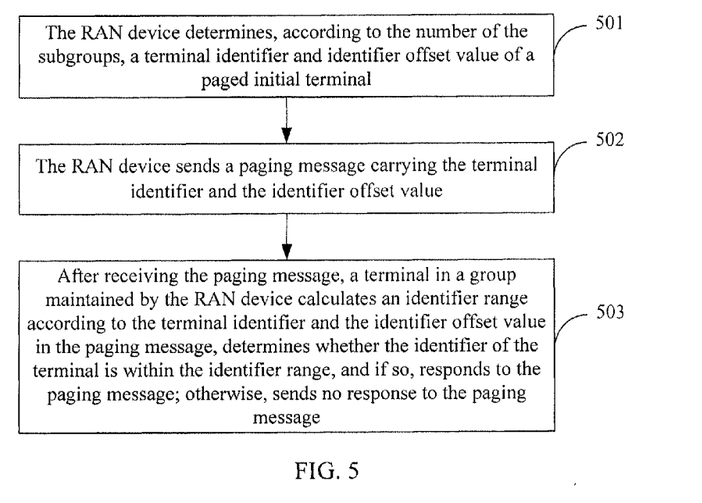
FIG. 5 is a second flowchart for initiating and responding to the paging according to Embodiment 4 of the present invention.

FIG. 5 shows the second manner. The procedure for initiating and responding to a paging message is as follows:

501: The RAN device determines, according to the number of the subgroups, a terminal identifier and identifier offset value of a paged initial terminal, where the number of terminals within an identifier range corresponding to the terminal identifier and identifier offset value is equal to the number of terminals in each subgroup calculated according to the number of the subgroups and the number of terminals in a group maintained by the RAN device.

502: The RAN device sends a paging message carrying the terminal identifier and the identifier offset value.

503: After receiving the paging message, a terminal in a group maintained by the RAN device calculates an identifier range according to the terminal identifier and the identifier offset value in the paging message, determines whether the identifier of the terminal is within the identifier range, and if the identifier of the terminal is within the identifier range, responds to the paging message; if the identifier of the terminal is not within the identifier range, no responds to the paging message.

The paged initial terminal is designated by the RAN device in advance. The identifier offset value is determined according to the number of the subgroups based on the following rule: the number of terminals within an identifier range corresponding to the identifier and the identifier offset value of the paged initial terminal is equal to the number of terminals in each subgroup calculated according to the number of the subgroups and number of terminals in a group maintained by the RAN device. The determination rule ensures the number of accessed terminals does not exceed the capacity of the RAN device and the CN device, thereby avoiding access congestion at an air interface. The calculated identifier range is [terminal identifier of a paged initial terminal, terminal identifier of a paged initial terminal+identifier offset value].

Figure 6:
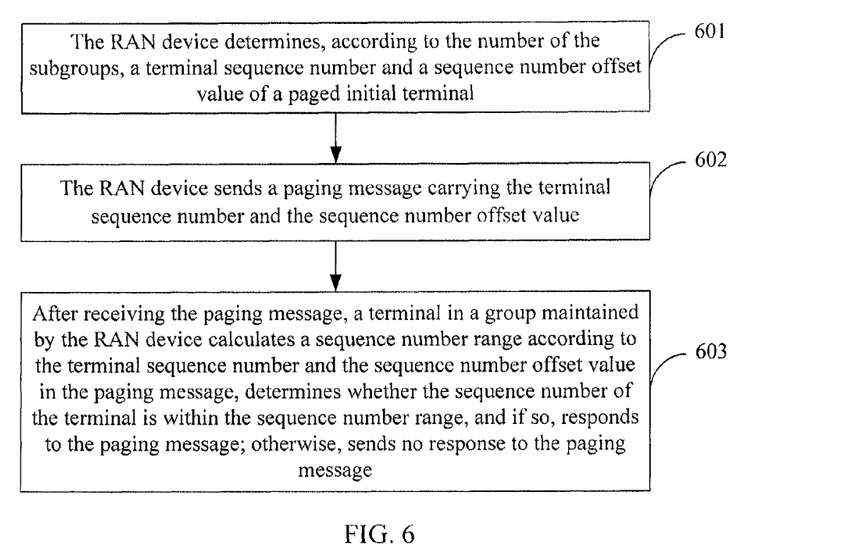
FIG. 6 is a third flowchart for initiating and responding to the paging according to Embodiment 4 of the present invention.

FIG. 6 shows the third manner. The procedure for initiating and responding to a paging message is as follows:

601: The RAN device determines, according to the number of the subgroups, a terminal sequence number and a sequence number offset value of a paged initial terminal, where the number of terminals within a sequence number range corresponding to the terminal sequence number and sequence number offset value is equal to the number of terminals in each subgroup calculated according to the number of the subgroups and the number of terminals in a group maintained by the RAN device.

602: The RAN device sends a paging message carrying the terminal sequence number and the sequence number offset value.

603: After receiving the paging message, a terminal in a group maintained by the RAN device calculates a sequence number range according to the terminal sequence number and the sequence number offset value in the paging message, determines whether the sequence number of the terminal is within the sequence number range, and if the sequence number of the terminal is within the sequence number range, responds to the paging message; if the sequence number of the terminal is not within the sequence number range, no responds to the paging message.

The paged initial terminal is designated by the RAN device in advance. The sequence number offset value is determined according to the number of the subgroups based on the following rule: the number of terminals within a sequence number range corresponding to the sequence number and the sequence number offset value of the paged initial terminal is equal to the number of terminals in each subgroup calculated according to the number of the subgroups and number of terminals in a group maintained by the RAN device. The determination rule ensures the number of accessed terminals does not exceed the capacity of the RAN device and the CN device, thereby avoiding access congestion at an air interface. The calculated sequence number range is [terminal sequence number of a paged initial terminal, terminal sequence number of a paged initial terminal+sequence number offset value].

Figure 7:
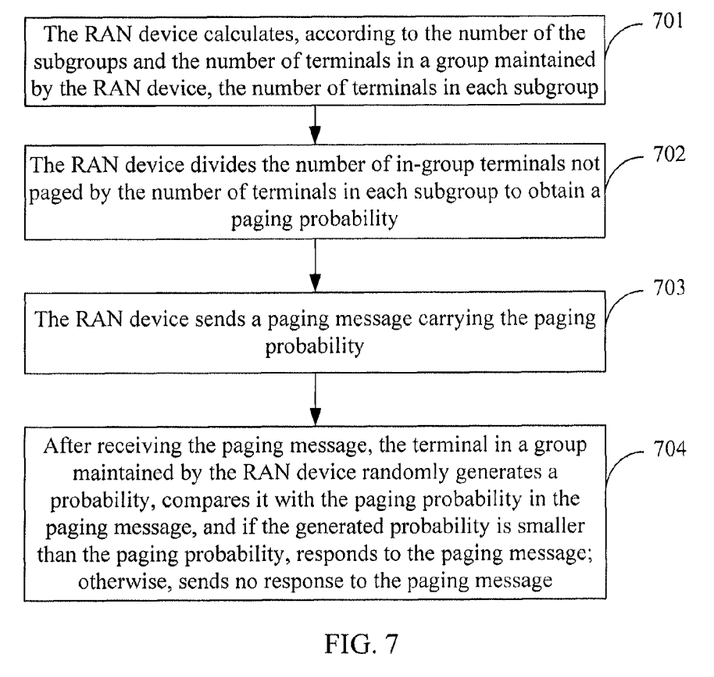
FIG. 7 is a fourth flowchart for initiating and responding to the paging according to Embodiment 4 of the present invention.

FIG. 7 shows the fourth manner. The procedure for initiating and responding to a paging message is as follows:

701: The RAN device calculates, according to the number of the subgroups and the number of terminals in a group maintained by the RAN device, the number of terminals in each subgroup.

702: The RAN device divides the number of in-group terminals not paged by the number of terminals in each subgroup to obtain a paging probability.

703: The RAN device sends a paging message carrying the paging probability.

704: After receiving the paging message, an in-group terminal maintained by the RAN device, if it has not responded to the paging message, randomly generates a probability, and compares it with the paging probability in the paging message. If the generated probability is smaller than the paging probability, the terminal responds to the paging message; if the generated probability is equal to or larger than the paging probability, the terminal does not respond to the paging message. Or, if the generated probability is smaller than or equal to the paging probability, the terminal responds to the paging message; if the generated probability is larger than the paging probability, the terminal does not respond to the paging message.

The probability randomly generated by the RAN device is a number ranging from 0 to 1, such as 0.2, 0.5, or 0.8, etc. The number of in-group terminals that are currently not paged is changing. When the paging is initiated for the first time, the number of in-group terminals that are currently not paged is equal to the total number of terminals in the group maintained by the RAN device; when the paging is initiated for the second time, a terminal that has responded to the paging will not respond to the same group call paging message, and the number of in-group terminals that are currently not paged is the total number of terminals in the group maintained by the RAN device minus the number of paged in-group terminals. For example, the total number of terminals in a group maintained by the RAN device is 100, the number of the subgroups is 5, and the number of terminals in each subgroup is 20. At the first paging, the paging probability is 20/100=0.2, which indicates a probability of terminals expected to be paged. Because each terminal randomly generates a probability, it is possible that 20 or less terminals respond to the first paging. At the second paging, if 20 terminals have responded, the number of terminals not paged is 80, and the paging probability changes to 20/80=0.25. The paging probability obtained each time varies.

Besides, in embodiments 1, 2, and 3, messages that are sent using the S1 interface or the Iu interface, namely, messages that are transmitted by the CN device and the RAN device using the S1 interface or the Iu interface, include but are not limited to any of the following messages: Paging message, Initial Context Setup message, or new message, etc. This is not limited in embodiments of the present invention.

Moreover, terminal identifiers involved in embodiments 1, 2, and 3 include but are not limited to any of the following: IMEI (International Mobile Equipment Identity, international mobile equipment identity), P-TMSI (Packet-Temporary Mobile Subscriber Identity, packet-temporary mobile subscriber identity), IMSI (International Mobile Subscriber Identity, international mobile subscriber identity), TLLI (Temporary Logical Link Identifier, temporary logical link identifier), or TMSI (Temporary Mobile Subscriber Identity, temporary mobile subscriber identity), etc.

According to the method provided in this embodiment, the number of subgroups in a group maintained by the RAN device is calculated according to the load of the CN device and the load of the RAN device, and a paging message carrying relevant information of the number of the subgroups is sent, so that a terminal receiving the paging message may determine, according to relevant information of the number of the subgroups, whether to respond to the paging message. This saves not only subgroup maintaining resources but also additional signaling and processing resources which are supposed to be consumed for change of subgroup configurations, and avoids access congestion at an air interface. The relevant information of the number of the subgroups carried in the paging message may be the number of the subgroups and a group sequence number, or a terminal identifier and an identifier offset value, or a terminal sequence number and a sequence number offset value, or a paging probability, enabling the terminal to perform different judgments to determine whether to respond to the paging message. Multiple implementation manners are provided to support more flexible applications.

Embodiment 5

Figure 8:
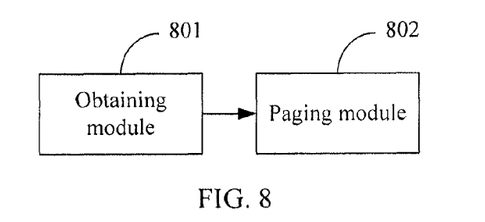
FIG. 8 is a structural diagram of a RAN device according to Embodiment 5 of the present invention.

As shown in FIG. 8, this embodiment provides a RAN device, including an obtaining module 801 and a paging module 802.

The obtaining module 801 is configured to obtain the number of subgroups in a group maintained by the RAN device, which is calculated according to the load of the RAN device.

The paging module 802 is configured to send a paging message carrying relevant information of the number of the subgroups, so that a terminal receiving the paging message determines, according to relevant information of the number of the subgroups, whether to respond to the paging message.

In this embodiment, the obtaining module 801 may be specifically configured to obtain the number of subgroups in a group maintained by the RAN device, which is calculated based on the load of a core network CN device and the load of the RAN device. The load of the RAN device includes: the available bearer resources of the RAN device, the available access resources of the RAN device, the access efficiency of the RAN device, and the number of terminals in a group maintained by the RAN device.

In this embodiment, the obtaining module 801 includes a first obtaining unit, or a second obtaining unit, or a third obtaining unit.

The first obtaining unit is configured to send the available bearer resources, available access resources, access efficiency, and number of terminals in the group maintained by the RAN device to the CN device, and receive, after the CN device calculates the number of subgroups in a group maintained by the RAN device according to available bearer resources of the RAN device, available access resources of the RAN device, access efficiency of the RAN device, and number of terminals in the group maintained by the RAN device, as well as an allowed access density calculated according to the load of the CN device, the number of the subgroups from the CN device.

The second obtaining unit is configured to receive the load of the CN device from the CN device, calculate an allowed access density according to the load of the CN device, and calculate, according to the allowed access density and the available bearer resources, available access resources, access efficiency, and number of terminals in the group maintained by the RAN device, the number of subgroups in the group maintained by the RAN device.

The third obtaining unit is configured to receive an allowed access density from the CN device, and calculate, according to the allowed access density and the available bearer resources, available access resources, access efficiency, and number of terminals in the group maintained by the RAN device, the number of subgroups in the group maintained by the RAN device, where the allowed access density is calculated by the CN device according to the load of the CN device.

In this embodiment, the paging module 802 includes a first paging unit, or a second paging unit, or a third paging unit, or a fourth paging unit.

The first paging unit is configured to send a paging message carrying the number of the subgroups and a group sequence number, so that a terminal which is in the group maintained by the RAN device after receiving the paging message, performs a modulo operation between an identifier or a sequence number of the terminal and the number of the subgroups in the paging message, and respond to the paging message if the modulo operation result is equal to the group sequence number in the paging message; otherwise, no respond to the paging message.

The second paging unit is configured to: determine, according to the number of the subgroups, a terminal identifier and an identifier offset value of a paged initial terminal, where the number of terminals within an identifier range corresponding to the terminal identifier and the identifier offset value is equal to the number of terminals in each subgroup calculated according to the number of the subgroups and the number of terminals in the group maintained by the RAN device; and send a paging message carrying the terminal identifier and the identifier offset value, so that a which is in the group maintained by the RAN device after terminal receiving the paging message, calculates an identifier range according to the terminal identifier and the identifier offset value in the paging message, determines whether the identifier of the terminal is within the identifier range, and if the identifier of the terminal is within the identifier range, responds to the paging message; if the identifier of the terminal is not within the identifier range, no responds to the paging message.

The third paging unit is configured to: determine, according to the number of the subgroups, a terminal sequence number and a sequence number offset value of a paged initial terminal, where the number of terminals within a sequence number range corresponding to the terminal sequence number and the sequence number offset value is equal to the number of terminals in each subgroup calculated according to the number of the subgroups and the number of terminals in the group maintained by the RAN device; and send a paging message carrying the terminal sequence number and the sequence number offset value, so that a terminal which is in a group maintained by the RAN device after receiving the paging message, calculates a sequence number range according to the terminal sequence number and the sequence number offset value in the paging message, determines whether the sequence number of the terminal is within the sequence number range, and if the sequence number of the terminal is within the sequence number range, responds to the paging message; if the sequence number of the terminal is not within the sequence number range, no responds to the paging message.

The fourth paging unit is configured to: calculate, according to the number of the subgroups and the number of terminals in a group maintained by the RAN device, the number of terminals in each subgroup; divide the number of in-group terminals not paged by the number of terminals in each subgroup to obtain a paging probability; and send a paging message carrying the paging probability, so that a terminal in the group maintained by the RAN device after receiving the paging message, if the terminal has not responded to a paging message before, randomly generates a probability, and compares the generated probability with the paging probability in the paging message: if the generated probability is smaller than the paging probability, responds to the paging message; if the generated probability is equal to or larger than the paging probability, no responds to the paging message; or, if the generated probability is smaller than or equal to the paging probability, responds to the paging message; if the generated probability is larger than the paging probability, no responds to the paging message In this embodiment, optionally, the RAN device may further include a recording module, configured to record the number of accessed in-group terminals and terminal information according to information reported by a terminal, or receive a message, which is sent by the CN device according to information reported by a terminal, and record the number of accessed in-group terminals and information of the terminals carried in the message. The terminal information is the same as that described in the above embodiments, which is not described any further.

The RAN device provided in this embodiment sends a paging message carrying relevant information of the number of the subgroups, so that a terminal receiving the paging message may determine, according to relevant information of the number of the subgroups, whether to respond to the paging. Compared with the prior art, the number of the subgroups and an in-group terminal being paged are dynamically determined without requiring the core network to maintain subgroup information, thereby saving subgroup maintaining resources as well as additional signaling and processing resources which are supposed to be consumed for change of subgroup configurations, and avoiding access congestion at an air interface.

Embodiment 6

A CN device provided in this embodiment includes a first sending module, or a second sending module, or a third sending module.

The first sending module is configured to send, after calculating an allowed access density according to a load of the CN device, receiving a load of a RAN device from the RAN device, and calculating the number of subgroups in a group maintained by the RAN device according to the load of the RAN device and the allowed access density, the number of the subgroups to the RAN device, so that the RAN device sends a paging message carrying relevant information of the number of the subgroups, where the relevant information of the number of the subgroups is used by a terminal receiving the paging message to determine whether to respond to the paging message.

The second sending module is configured to send a load of the CN device to a RAN device, so that the RAN device calculates an allowed access density according to the load of the CN device, calculates the number of subgroups in a group maintained by the RAN device according to the allowed access density and the load of the RAN device, and sends a paging message carrying relevant information of the number of the subgroups, where the relevant information of the number of the subgroups is used by a terminal receiving the paging message to determine whether to respond to the paging message.

The third sending module is configured to calculate an allowed access density according to a load of the CN device, and send the allowed access density to a RAN device, so that the RAN device calculates, according to the allowed access density and the load of the RAN device, the number of subgroups in a group maintained by the RAN device, and sends a paging message carrying relevant information of the number of the subgroups, where the relevant information of the number of the subgroups is used by a terminal receiving the paging message to determine whether to respond to the paging message.

The load of the RAN device in this embodiment includes: the available bearer resources of the RAN device, available access resources of the RAN device, access efficiency of the RAN device, and number of terminals in a group maintained the RAN device.

The second sending module may include: a sending subunit, configured to send the load of the CN device to the RAN device at preset intervals or when a specified event is detected.

In this embodiment, optionally, the CN device is further configured to send a message carrying the number of accessed in-group terminals and terminal information to the RAN device.

The CN device provided in this embodiment sends the load of the CN device, or the allowed access density, or the number of the subgroups to the RAN device, so that the RAN device sends a paging message carrying relevant information of the number of the subgroups, and therefore, a terminal receiving the paging message may determine, according to relevant information of the number of the subgroups, whether to respond to the paging. Compared with the prior art, the number of the subgroups and a currently paged in-group terminal are dynamically determined without requiring the core network to maintain subgroup information, thereby saving subgroup maintaining resources as well as additional signaling and processing resources which are supposed to be consumed for change of subgroup configurations, and avoiding access congestion at an air interface.

Embodiment 7

Figure 9:
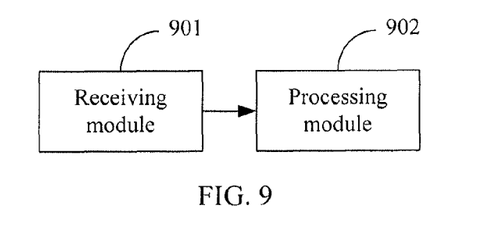
FIG. 9 is a structural diagram of a terminal according to Embodiment 7 of the present invention.

As shown in FIG. 9, a terminal provided in this embodiment includes a receiving module 901 and a processing module 902.

The receiving module 901 is configured to receive a paging message carrying relevant information of the number of subgroups in a group maintained by a RAN device.

The processing module 902 is configured to determine, according to relevant information of the number of the subgroups, whether to respond to the paging message.

The number of subgroups in the group maintained by the RAN device is calculated by the network according to the load of the RAN device.

Further, the load of the RAN device in this embodiment includes: the available bearer resources of the RAN device, available access resources of the RAN device, access efficiency of the RAN device, and number of terminals in a group maintained by the RAN device.

In the first implementation manner, relevant information of the number of the subgroups include the number of the subgroups and a group sequence number; accordingly, the processing module 902 includes a first processing unit, configured to perform a modulo operation between the terminal identifier or the sequence number and the number of the subgroups in the paging message, and if the modulo operation result is equal to the group sequence number in the paging message, respond to the paging message; otherwise, no respond to the paging message.

In the second implementation manner, relevant information of the number of the subgroups includes a terminal identifier and an identifier offset value of a paged initial terminal, where the number of terminals within an identifier range corresponding to the terminal identifier and identifier offset value is equal to the number of terminals in each subgroup calculated according to the number of the subgroups and the number of terminals in the group maintained by the RAN device; accordingly, the processing module 902 includes: a second processing unit, configured to calculate an identifier range according to the terminal identifier and identifier offset value in the paging message, determine whether the identifier of the terminal is within the identifier range, and if the identifier of the terminal is within the identifier range, respond to the paging message; if the identifier of the terminal is not within the identifier range, no respond to the paging message.

In the third implementation manner, relevant information of the number of the subgroups includes a terminal sequence number and a sequence number offset value of a paged initial terminal, where the number of terminals within a sequence number range corresponding to the terminal sequence number and sequence number offset value is equal to the number of terminals in each subgroup calculated according to the number of the subgroups and the total number of terminals in the group maintained by the RAN device; accordingly, the processing module 902 includes: a second processing unit, configured to calculate a sequence number range according to the terminal sequence number and the sequence number offset value in the paging message, determine whether the sequence number of the terminal is within the sequence number range, and if the sequence number of the terminal is within the sequence number range, respond to the paging message; if the sequence number of the terminal is not within the sequence number range, no respond to the paging message.

In the fourth implementation manner, relevant information of the number of the subgroups includes a paging probability, which is calculated by dividing the number of terminals in each subgroup by the number of in-group terminals currently not paged, where the number of terminals in each subgroup is calculated according to the number of the subgroups and the total number of terminals in the group maintained by the RAN device. Accordingly, the processing module 902 includes: a fourth processing unit, configured to randomly generate, if the terminal has not responded to the paging message, a probability, and compare the generated probability with the paging probability in the paging message: if the generated probability is smaller than the paging probability, respond to the paging message; if the generated probability is equal to or larger than the paging probability, no respond to the paging message; or, if the generated probability is smaller than or equal to the paging probability, respond to the paging message; if the generated probability is larger than the paging probability, no respond to the paging message.

The terminal provided in this embodiment receives a paging message carrying relevant information of the number of the subgroups, and determines, according to relevant information of the number of the subgroups, whether to respond to the paging message. This saves not only subgroup maintaining resources on the network but also additional signaling and processing resources consumed for change of subgroup configurations, and avoids access congestion at an air interface. The terminal may perform different judgments to determine, according to the number of the subgroups and a group sequence number, or a terminal identifier and an identifier offset value, or a terminal sequence number and a sequence number offset value, or a paging probability, whether to respond to a paging message. Multiple implementation manners are provided to support more flexible applications.

The solutions provided in embodiments of the present invention may be applied to UMTS, LTE, and GSM systems, etc, which is not limited in embodiments of the present invention.

It should be noted that persons of ordinary skill in the art may understand that all or part of processes in the methods of the above embodiments may be implemented by relevant hardware instructed by a computer program. The program may be stored in a computer readable storage medium and when executed, may include the processes of the embodiments of the above methods. The storage medium may be a magnetic disk, an optical disk, a read-only memory (ROM), or a random access memory (RAM).

In addition, function units in the embodiments of the present invention may be integrated into a processing module, or each of the units may exist alone physically, or two or more units are integrated into a module. The integrated module may be implemented in the form of hardware, or may be implemented in the form of a software functional module. When the integrated module is implemented in form of a software function module and sold or used as an independent product, the module may be stored in a computer readable storage medium. The storage medium may be a ROM, a magnetic disk, or a CD-ROM. The above apparatus or system may perform methods according to corresponding embodiments.

The above descriptions are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A group call method, wherein the method comprises:
   calculating, by one of a core network (CN) device or a radio access network (RAN) device, according to a load of the RAN device, a number of subgroups in a group, wherein terminal information in each subgroup is not maintained by the CN device or the RAN device; and
   sending, by the RAN device, a paging message carrying relevant information of the number of the subgroups, so that a terminal receiving the paging message determines, according to the relevant information of the number of the subgroups, whether to respond to the paging message.

2. The method according to claim 1, wherein the calculating, by the CN device or the RAN device, according to the load of the RAN device, the number of the subgroups in the group comprises:
   calculating, according to a load of CN device and the load of the RAN device, the number of subgroups in the group.

3. The method according to claim 2, wherein the load of the RAN device comprises:
   available bearer resources of the RAN device, available access resources of the RAN device, access efficiency of the RAN device, and number of terminals in a group.

4. The method according to claim 3, wherein the calculating, according to the load of the CN device and the load of the RAN device, the number of the subgroups in the group comprises one of:
   calculating, by the CN device, an allowed access density according to the load of the CN device, and sending the allowed access density to the RAN device, so that the RAN device receives the allowed access density, and calculates, according to the available bearer resources of the RAN device, the available access resources of the RAN device, the access efficiency of the RAN device, the number of terminals in the group, and the allowed access density, the number of subgroups in the group;
   calculating, by the CN device, an allowed access density according to the load of the CN device, receiving the available bearer resources of the RAN device, the available access resources of the RAN device, the access efficiency of the RAN device, and the number of the terminals in the group sent from the RAN device, calculating, according to the available bearer resources, the available access resources, the access efficiency, the number of the terminals in the group, and the allowed access density, the number of subgroups in the group, and sending the number of the subgroups to the RAN device; and
   receiving, by the RAN device, the load of the CN device sent from the CN device, calculating an allowed access density according to the load of the CN device, and calculating, according to the available bearer resources of the RAN device, the available access resources of the RAN device, the access efficiency of the RAN device, and the number of the terminals in the group, as well as the allowed access density, the number of subgroups in a group.

5. The method according to claim 4, wherein before the receiving, by the RAN device, the load of the CN device sent from the CN device, the method further comprises:
   sending, by the CN device, the load of the CN device to the RAN device at a preset interval or when a specified event is detected.

6. The method according to claim 4, wherein the calculating the allowed access density according to the load of the CN device comprises:
   comparing the load of the CN device with a preset threshold range; and
   obtaining the allowed access density corresponding to the load threshold range.

7. The method according to claim 1, wherein the sending the paging message carrying the relevant information of the number of the subgroups, so that the terminal receiving the paging message determines, according to the relevant information of the number of the subgroups, whether to respond to the paging message comprises:
   sending the paging message carrying the number of the subgroups and a group sequence number; and
   after a terminal in the group receives the paging message, performing a modulo operation for the number of the subgroups in the paging message via one of an identifier of the terminal and a sequence number of the terminal, and responding to the paging message if the modulo operation result is equal to a group sequence number in the paging message, or no responding to the paging message if the modulo operation result is not equal to the group sequence number in the paging message.

8. The method according to claim 1, wherein the sending the paging message carrying the relevant information of the number of the subgroups, so that the terminal receiving the paging message determines, according to the relevant information of the number of the subgroups, whether to respond to the paging message, comprises:
   determining, according to the number of the subgroups, a terminal identifier and an identifier offset value of a paged initial terminal, wherein a number of terminals within an identifier range corresponding to the terminal identifier and the identifier offset value is equal to a number of terminals in each subgroup calculated according to the number of the subgroups and the number of the terminals in the group;

sending the paging message carrying the terminal identifier and the identifier offset value; and after receiving the paging message carrying the terminal identifier and the identifier offset value, calculating, by a terminal in the group, an identifier range according to the terminal identifier and the identifier offset value carried in the paging message, determining whether a identifier of the terminal is within the identifier range, and if the identifier of the terminal is within the identifier range, responding to the paging message; if the identifier of the terminal is not within the identifier range, no responding to the paging message.

9. The method according to claim 1, wherein the sending the paging message carrying the relevant information of the number of the subgroups, so that the terminal receiving the paging message determines, according to the relevant information of the number of the subgroups, whether to respond to the paging message, comprises:

determining, according to the number of the subgroups, a terminal sequence number and a sequence number offset value of a paged initial terminal, wherein a number of terminals within a sequence number range corresponding to the terminal sequence number and the sequence number offset value is equal to a number of terminals in each subgroup calculated according to the number of the subgroups and the number of terminals in the group;

sending the paging message carrying the terminal sequence number and the sequence number offset value; and after receiving the paging message carrying the terminal sequence number and the sequence number offset value, calculating, by a terminal in the group, a sequence number range according to the terminal sequence number and the sequence number offset value in the paging message, determining whether a sequence number of the terminal is within the sequence number range, and if the sequence number of the terminal is within the sequence number range, responding to the paging message; if the sequence number of the terminal is not within the sequence number range, no responding to the paging message.

10. The method according to claim 1, wherein the sending the paging message carrying the relevant information of the number of the subgroups, so that the terminal receiving the paging message determines, according to the relevant information of the number of the subgroups, whether to respond to the paging message, comprises:

calculating, according to the number of the subgroups and the number of terminals in the group, a number of terminals in each subgroup;

dividing a number of in-group terminals not paged by the number of terminals in each subgroup to obtain a paging probability;

sending the paging message carrying the paging probability;

after a terminal in the group the paging message carrying the paging probability, if the terminal has not responded to the paging message before, randomly generating a probability and comparing the generated probability with the paging probability in the paging message; and responding to the paging message if the generated probability is smaller than the paging probability; or, no responding to the paging message if the generated probability is equal to or larger than the paging probability.

11. The method according to claim 1, wherein before the calculating, by one of a core network (CN) device or a radio access network (RAN) device, according to the load of the radio access network RAN device, the number of subgroups in the group maintained by the RAN device, the method further comprises one of:

recording, by the RAN device, a number of accessed in-group terminals and terminal information according to information reported by a terminal;

receiving, by the RAN device, a message which is sent from the CN device according to information reported by a terminal, and recording a number of accessed in-group terminals and information of the terminals carried in the message.

12. A radio access network (RAN) device, wherein the RAN device comprises:

a processor, configured to obtain a number of subgroups in a group, wherein the number of the subgroups in the group is calculated according to a load of the RAN device by a core network (CN) device or the RAN device, wherein terminal information in each subgroup is not maintained by the CN device or the RAN device; and a transmitter, configure to send a paging message carrying relevant information of the number of the subgroups, so that a terminal receiving the paging message determines, according to the relevant information of the number of the subgroups, whether to respond to the paging message.

13. The device according to claim 12, wherein the processor is specifically configured to obtain the number of the subgroups in the group, wherein the number of the subgroups in the group is calculated according to a load of the CN device and the load of the RAN device.

14. The device according to claim 13, wherein the load of the RAN device comprises: available bearer resources of the RAN device, available access resources of the RAN device, access efficiency of the RAN device, and number of terminals in a group.

15. The device according to claim 14, wherein, the transmitter is further configured to send the available bearer resources of the RAN device, the available access resources of the RAN device, the access efficiency of the RAN device, and number of terminals in the group to the CN device, and the device further comprises: a receiver, configured to receive, after the CN device calculates the number of subgroups in a group according to the available bearer resources of the RAN device, the available access resources of the RAN device, the access efficiency of the RAN device, and number of terminals in the group, as well as an allowed access density calculated according to the load of the CN device, the number of the subgroups from the CN device.

16. The device according to claim 14, wherein, the device further comprises: a receiver, configured to receive the load of the CN device from the CN device; and the processor is further configured to calculate an allowed access density according to the load of the CN device, and calculate, according to the allowed access density and the available bearer resources of the RAN device, the available access resources of the RAN device, the access efficiency of the RAN device, and number of terminals in the group, the number of subgroups in the group.

17. The device according to claim 14, wherein,
the device further comprises: a receiver, configured to receive an allowed access density from the CN device, and
the processor is further configured to calculate, according to the allowed access density and the available bearer resources of the RAN device, the available access resources of the RAN device, the access efficiency of the RAN device, and number of terminals in the group, the number of subgroups in the group, wherein the allowed access density is calculated by the CN device according to the load of the CN device.

18. The device according to claim 12, wherein,
the transmitter is further configured to send the paging message carrying the number of the subgroups and a group sequence number, so that a terminal which is in the group after receiving the paging message, performs a modulo operation between one of an identifier of the terminal and a sequence number of the terminal and the number of the subgroups in the paging message, and responds to the paging message if the modulo operation result is equal to the group sequence number in the paging message or no sends response if the modulo operation result is not equal to the group sequence number in the paging message.

19. The device according to claim 12, wherein,
the processor is further configured to: determine, according to the number of the subgroups, a terminal identifier and an identifier offset value of a paged initial terminal, wherein a number of terminals within an identifier range corresponding to the terminal identifier and the identifier offset value is equal to a number of terminals in each subgroup calculated according to the number of the subgroups and the number of terminals in the group; and
the transmitter is further configured to send the paging message carrying the terminal identifier and the identifier offset value, so that a terminal which is in the group after receiving the paging message, calculates an identifier range according to the terminal identifier and the identifier offset value in the paging message, determines whether a identifier of the terminal is within the identifier range, and if the identifier of the terminal is within the identifier range, responds to the paging message; if the identifier of the terminal is not within the identifier range, no responds to the paging message.

20. The device according to claim 12, wherein,
the processor is further configured to: determine, according to the number of the subgroups, a terminal sequence number and a sequence number offset value of a paged initial terminal, wherein a number of terminals within a sequence number range corresponding to the terminal sequence number and the sequence number offset value is equal to a number of terminals in each subgroup calculated according to the number of the subgroups and the number of terminals in the group; and
the transmitter is further configured to send the paging message carrying the terminal sequence number and the sequence number offset value, so that a terminal which is in a group after receiving the paging message, calculates a sequence number range according to the terminal sequence number and the sequence number offset value in the paging message, determines whether a sequence number of the terminal is within the sequence number range, and if the sequence number of the terminal is within the sequence number range, responds to the paging message; if the sequence number of the terminal is not within the sequence number range, no responds to the paging message.

21. The device according to claim 12, wherein,
the processor is further configured to: calculate, according to the number of the subgroups and the number of terminals in a group, a number of terminals in each subgroup; divide the number of in-group terminals not paged by the number of terminals in each subgroup to obtain a paging probability; and
the transmitter is further configured to send the paging message carrying the paging probability, so that a terminal in the group after receiving the paging message, if the terminal has not responded to the paging message before, randomly generates a probability, and compares the generated probability with the paging probability in the paging message, if the generated probability is smaller than the paging probability, responds to the paging message; if the generated probability is equal to or larger than the paging probability, no responds to the paging message; or, if the generated probability is smaller than or equal to the paging probability, responds to the paging message; if the generated probability is larger than the paging probability, no responds to the paging message.

22. The device according to claim 12, wherein,
the processor is further configured to record a number of accessed in-group terminals and terminal information according to information reported by a terminal.

23. The device according to claim 12, wherein the device comprises:
a receiver, configured to receive a message, which is sent from the CN device according to information reported by a terminal, and
wherein the processor is further configured to record a number of accessed in-group terminals and information of the terminals carried in the message.

24. A core network (CN) device, wherein the CN comprises:
a receiver, configured to receive a load of a radio access network (RAN) device from the RAN device;
a processor, configured to calculate an allowed access density according to a load of the CN device and calculate, according to the load of the RAN device and the allowed access density, a number of subgroups in a group, wherein terminal information in each subgroup is not maintained by the CN device or the RAN device; and
a transmitter, configured to send the number of the subgroups to the RAN device, so that the RAN device sends a paging message carrying relevant information of the number of the subgroups, wherein the relevant information of the number of the subgroups is used by a terminal receiving the paging message to determine whether to respond to the paging message.

25. The device according to claim 24, wherein the load of the RAN device comprises: available bearer resources of the RAN device, available access resources of the RAN device, access efficiency of the RAN device, and number of terminals in a group.

26. The device according to claim 24, wherein,
the transmitter is further configured to send the load of the CN device to the RAN device at preset intervals or when a specified event is detected.

27. The device according to claim 24, wherein the transmitter is further configured to send, according to information reported by a terminal, a message carrying a number of accessed in-group terminals and terminal information to the RAN device.

28. A core network (CN) device, wherein the CN comprises:
a transmitter, configured to send a load of the CN device to a radio access network (RAN) device, so that the RAN device calculates an allowed access density according to the load of the CN device, calculates a number of subgroups in a group according to the allowed access density and the load of the RAN device, wherein terminal information in each subgroup is not maintained by the CN device or the RAN device, and sends the paging message carrying relevant information of the number of the subgroups, wherein the relevant information of the number of the subgroups is used by a terminal receiving the paging message to determine whether to respond to the paging message.

29. The device according to claim 28, wherein the load of the RAN device comprises: available bearer resources of the RAN device, available access resources of the RAN device, access efficiency of the RAN device, and number of terminals in a group.

30. The device according to claim 28, wherein the transmitter is further configured to send the load of the CN device to the RAN device at preset intervals or when a specified event is detected.

31. The device according to claim 28, wherein the transmitter is further configured to send, according to information reported by a terminal, a message carrying a number of accessed in-group terminals and terminal information to the RAN device.

32. A core network (CN) device, wherein the CN comprises:
a processor, configured to calculate an allowed access density according to a load of the CN device, and
a transmitter, configured to send the allowed access density to a radio access network (RAN) device, so that the RAN device calculates, according to the allowed access density and the load of the RAN device, a number of subgroups in a group, wherein terminal information in each subgroup is not maintained by the CN device or the RAN device, and sends the paging message carrying relevant information of the number of the subgroups, wherein the relevant information of the number of the subgroups is used by a terminal receiving the paging message to determine whether to respond to the paging message.

33. The device according to claim 32, wherein the load of the RAN device comprises: available bearer resources of the RAN device, available access resources of the RAN device, access efficiency of the RAN device, and number of terminals in a group.

34. The device according to claim 32, wherein the transmitter is further configured to send the load of the CN device to the RAN device at preset intervals or when a specified event is detected.

35. The device according to claim 32, wherein the transmitter is further configured to send, according to information reported by a terminal, a message carrying a number of accessed in-group terminals and terminal information to the RAN device.

36. A terminal, wherein the terminal comprises:
a receiver, configured to receive a paging message carrying relevant information of a number of subgroups in a group; and
a processor, configured to determine, according to relevant information of the number of the subgroups, whether to respond to the paging message;
wherein the number of subgroups in the group is calculated by one of a core network (CN) device or a radio access network (RAN) device, according to a load of the RAN device, wherein terminal information in each subgroup is not maintained by the CN device or the RAN device.

37. The terminal according to claim 36, wherein the relevant information of the number of the subgroups comprises the number of the subgroups and a group sequence number;
the processor is further configured to perform a modulo operation between one of an identifier of the terminal and a sequence number of the terminal and the number of the subgroups in the paging message, and
wherein the device further comprises a transmitter, configured to send a response responding to the paging message if the modulo operation result is equal to the group sequence number in the paging message, or no send a response responding to the paging message if the modulo operation result is not equal to the group sequence number in the paging message.

38. The terminal according to claim 36, wherein the relevant information of the number of the subgroups comprises: a terminal identifier and an identifier offset value of a paged initial terminal, a number of terminals within an identifier range corresponding to the terminal identifier and the identifier offset value being equal to a number of terminals in each subgroup calculated according to the number of the subgroups and the number of terminals in the group;
the processor is further configured to calculate, according to the terminal identifier and the identifier offset value in the paging message, an identifier range, determine whether an identifier of the terminal is within the identifier range, and
wherein the device further comprises a transmitter, configured to send a response responding to the paging message if the identifier of the terminal is within the identifier range; no send a response responding to the paging message if the identifier of the terminal is not within the identifier range.

39. The terminal according to claim 36, wherein the relevant information of the number of the subgroups comprises: a terminal sequence number and a sequence number offset value of a paged initial terminal, a number of terminals within a sequence number range corresponding to the terminal sequence number and the sequence number offset value being equal to a number of terminals in each subgroup calculated according to the number of the subgroups and the number of terminals in the group;
the processor is further configured to calculate, according to the terminal sequence number and the sequence number offset value in the paging message, a sequence number range, determine whether a sequence of the terminal number is within the sequence number range, and
wherein the device further comprises a transmitter, configured to send a response responding to the paging message if the sequence of the terminal number is within the sequence number range; no send a response responding to the paging message if sequence of the terminal number is not within the sequence number range.

40. The terminal according to claim 36, wherein the relevant information of the number of the subgroups comprises a paging probability, which is calculated by dividing a number of in-group terminals not paged by a number of terminals in each subgroup, the number of terminals in each subgroup being calculated according to the number of the subgroups and a number of terminals in the group;

the processor is further configured to randomly generate, if the terminal has not responded to the paging message, a probability, and compare the generated probability with the paging probability in the paging message, and wherein the device further comprises a transmitter, configured to send a response responding to the paging message if the generated probability is smaller than the paging probability; no send a response responding to the paging message if the generated probability is equal to or larger than the paging probability.

* * * * *